United States Patent
Vivanco et al.

(10) Patent No.: US 11,622,298 B2
(45) Date of Patent: *Apr. 4, 2023

(54) APPARATUSES AND METHODS FOR MANAGING AND REGULATING POWER CONSUMPTION AND RESOURCE ALLOCATIONS IN COMMUNICATION SYSTEMS AND NETWORKS

(71) Applicants: AT&T Intellectual Property I, L.P., Atlanta, GA (US); AT&T Technical Services Company, Inc., Vienna, VA (US)

(72) Inventors: Daniel Vivanco, Ashburn, VA (US); David Ross Beppler, Duluth, GA (US); Slawomir Mikolaj Stawiarski, Carpentersville, IL (US)

(73) Assignees: AT&T Intellectual Property I, L.P., Atlanta, GA (US); AT&T Technical Services Company, Inc., Vienna, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/882,651

(22) Filed: Aug. 8, 2022

(65) Prior Publication Data
US 2022/0386173 A1 Dec. 1, 2022

Related U.S. Application Data

(63) Continuation of application No. 17/320,266, filed on May 14, 2021, now Pat. No. 11,445,407.

(51) Int. Cl.
*H04W 28/08* (2009.01)
*H04W 28/16* (2009.01)

(52) U.S. Cl.
CPC ... *H04W 28/0908* (2020.05); *H04W 28/0867* (2020.05); *H04W 28/0925* (2020.05); *H04W 28/16* (2013.01)

(58) Field of Classification Search
CPC ......... H04W 28/0908; H04W 28/0867; H04W 28/0925; H04W 28/16
See application file for complete search history.

(56) References Cited

U.S. PATENT DOCUMENTS

| | | | |
|---|---|---|---|
| 8,681,724 B2 * | 3/2014 | Du | H04L 5/0007 370/329 |
| 10,660,104 B2 * | 5/2020 | Patil | H04W 72/048 |

(Continued)

FOREIGN PATENT DOCUMENTS

WO 2016190789 A1 12/2016

OTHER PUBLICATIONS

Yilmazetal,"OverviewofLTE-NRDualConnectivity",2019IEEE (Year: 2019).*

(Continued)

*Primary Examiner* — Omer S Mian
(74) *Attorney, Agent, or Firm* — Guntin & Gust, PLC; Mark Wilinski

(57) ABSTRACT

Aspects of the subject disclosure may include, for example, computing a first time gap associated with a completion of a first transfer of first data via a first network connection and a completion of a second transfer of second data via a second network connection that is different from the first network connection, determining, based on the computing of the first time gap, that the first time gap exceeds a threshold, and adjusting, based on the determining, respective shares of third data that are to be transferred via the first network connection and the second network connection. Other embodiments are disclosed.

20 Claims, 7 Drawing Sheets

(56) References Cited

U.S. PATENT DOCUMENTS

| | | | |
|---|---|---|---|
| 11,140,743 B2* | 10/2021 | Panchal | H04W 76/16 |
| 2014/0004862 A1 | 1/2014 | Ekemark | |
| 2017/0223699 A1* | 8/2017 | Yasukawa | H04W 72/0433 |
| 2017/0339744 A1* | 11/2017 | Latheef | H04W 52/0235 |
| 2018/0049214 A1 | 2/2018 | Kubota et al. | |
| 2018/0279376 A1 | 9/2018 | Dinan et al. | |
| 2019/0319833 A1 | 10/2019 | Nagaraja et al. | |
| 2019/0357292 A1 | 11/2019 | Cirik et al. | |
| 2020/0059841 A1 | 2/2020 | Zhang et al. | |
| 2020/0146063 A1 | 5/2020 | Xu et al. | |
| 2021/0051634 A1* | 2/2021 | Fakoorian | H04L 1/1887 |
| 2021/0084536 A1 | 3/2021 | Chou et al. | |
| 2022/0095176 A1 | 3/2022 | Lim et al. | |
| 2022/0132612 A1* | 4/2022 | Chang | H04W 60/005 |
| 2022/0287135 A1* | 9/2022 | Wu | H04W 76/30 |

OTHER PUBLICATIONS

Atanasov,etal,"ProgrammabilityofMulti-onnectivityin5G",2022,IEEE (Year: 2022).*
Centenaro,etal."Resource-EfficientDualConnectivityforUltra-ReliableLow-LatencyCommunication" 2020,IEEE (Year: 2020).*
Atanasov, Ivaylo et al., "Programmability of Multi-Connectivity in 5G", IEEE, 2022, 8 pages.
Centenaro, Marco et al., "Resource-Efficient Dual Connectivity for Ultra-Reliable Low-Latency Communication", IEEE, 2022, 5 pages.
Yilmaz, Osman N. et al., "Overview of LTE-NR Dual Connectivity", IEEE, 2019, 7 pages.

* cited by examiner

APPARATUSES AND METHODS FOR MANAGING AND REGULATING POWER CONSUMPTION AND RESOURCE ALLOCATIONS IN COMMUNICATION SYSTEMS AND NETWORKS

CROSS REFERENCE TO RELATED APPLICATIONS

This application is a continuation of U.S. patent application Ser. No. 17/320,266 filed on May 14, 2021. All sections of the aforementioned application are incorporated herein by reference in their entirety.

FIELD OF THE DISCLOSURE

The subject disclosure relates to apparatuses and methods for managing and regulating power consumption and resource allocations in communication systems and networks.

BACKGROUND

As the world increasingly becomes connected via vast communication networks and via various communication devices, additional opportunities are created/generated to provision data to such devices. A communication device may be able to connect to two networks at once (hereinafter referred to as a state or condition of dual connectivity). The use of dual connectivity may enhance the amount of data that may be provided from, e.g., network infrastructure to the communication device over time (e.g., may enhance the effective throughput), which can facilitate an execution of high-quality, data-rich applications (e.g., streaming video) at the communication device.

Operations that are executed by a communication device are accompanied by a consumption/dissipation of power. In the context of mobile communication devices, the consumption/dissipation of power is frequently accompanied by a reduction in a battery level that is available/remaining following the execution of the operations. The use of dual connectivity represents significant challenges in terms of managing and regulating power consumption by a communication device (or, analogously, operations executed by the communication device).

BRIEF DESCRIPTION OF THE DRAWINGS

Reference will now be made to the accompanying drawings, which are not necessarily drawn to scale, and wherein.

DETAILED DESCRIPTION

Figure 1:
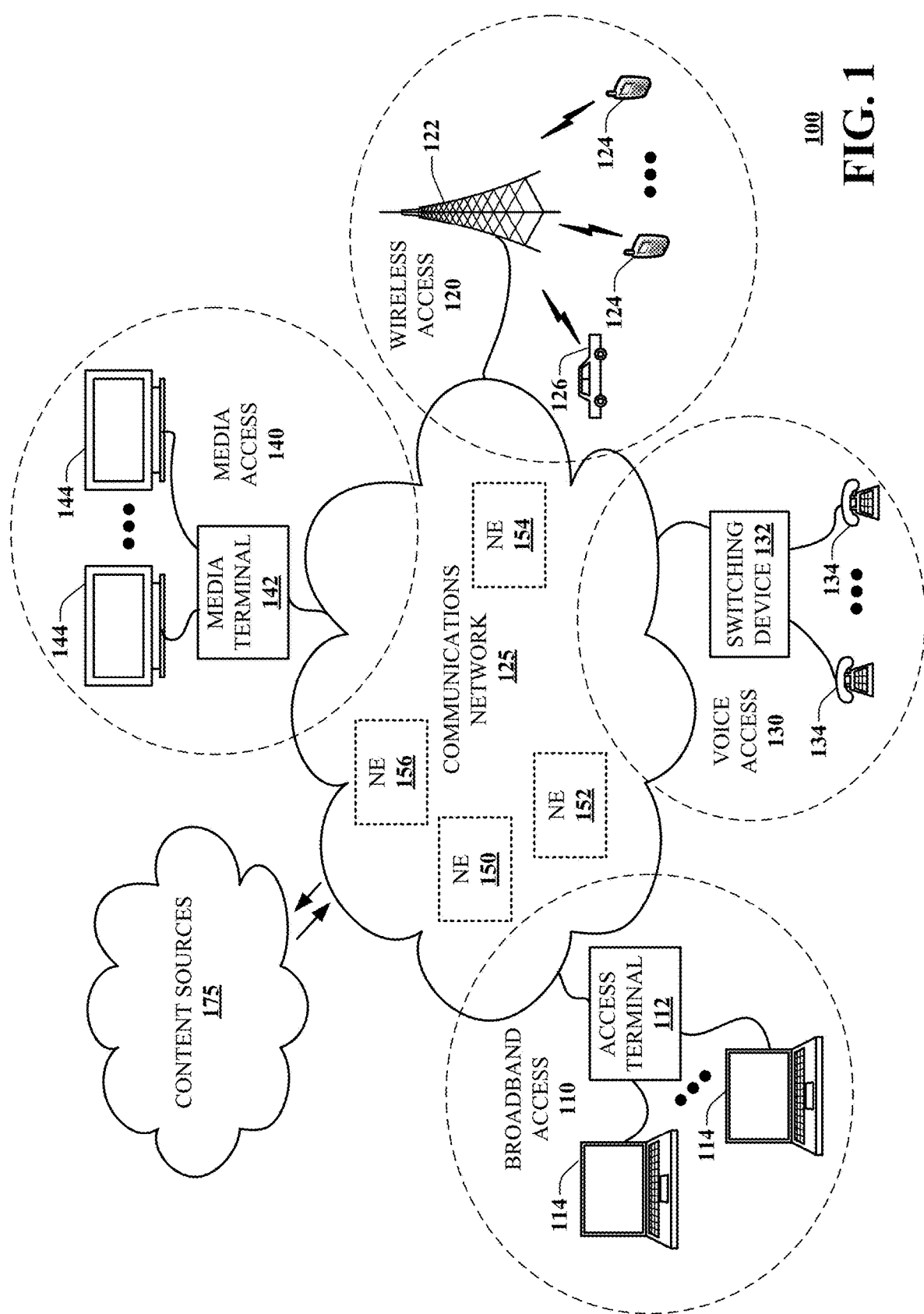
FIG. 1 is a block diagram illustrating an exemplary, non-limiting embodiment of a communications network in accordance with various aspects described herein.

The subject disclosure describes, among other things, illustrative embodiments for managing/regulating shares of traffic/data allocated to networks or network connections based on parameters associated with the networks/network connections. Other embodiments are described in the subject disclosure.

One or more aspects of the subject disclosure include, in whole or in part, obtaining a first value for a first inactivity timer associated with a first network connection, wherein the first network connection is used to provision a first portion of a first communication service to a first user equipment, obtaining a second value for a second inactivity timer associated with a second network connection, wherein the second network connection is used to provision a second portion of the first communication service to the first user equipment, computing a first time associated with a completion of a transfer of first data via the first network connection, wherein the first data is associated with the first portion of the first communication service, computing a second time associated with a completion of a transfer of second data via the second network connection, wherein the second data is associated with the second portion of the first communication service, and computing a first time gap for releasing at least one resource in a first network associated with the first network connection based on: the first value for the first inactivity timer, the second value for the second inactivity timer, the first time, and the second time.

One or more aspects of the subject disclosure include, in whole or in part, identifying a first value corresponding to a completion of a transmission of first data to a communication device via a first network connection, identifying a second value corresponding to a completion of a transmission of second data to the communication device via a second network connection that is different from the first network connection, computing a first term as a summation of the first value and a first inactivity timer, computing a second term as a summation of the second value and a second inactivity timer, wherein the second inactivity timer is different from the first inactivity timer, computing a value for a time gap as a difference between the first term and the second term, and adjusting respective shares of third data that are to be transmitted to the communication device via the first network connection and the second network connection based on the value for the time gap.

One or more aspects of the subject disclosure include, in whole or in part, computing a first time gap associated with a completion of a first transfer of first data via a first network connection and a completion of a second transfer of second data via a second network connection that is different from the first network connection, determining, based on the computing of the first time gap, that the first time gap exceeds a threshold, and adjusting, based on the determining, respective shares of third data that are to be transferred via the first network connection and the second network connection.

Referring now to FIG. 1, a block diagram is shown illustrating an example, non-limiting embodiment of a system 100 in accordance with various aspects described herein. For example, system 100 can facilitate in whole or in part obtaining a first value for a first inactivity timer associated with a first network connection, wherein the first network connection is used to provision a first portion of a first communication service to a first user equipment, obtaining a second value for a second inactivity timer associated with a second network connection, wherein the second network connection is used to provision a second portion of the first communication service to the first user equipment, computing a first time associated with a completion of a transfer of first data via the first network connection, wherein the first data is associated with the first portion of the first communication service, computing a second time associated with a completion of a transfer of second data via the second network connection, wherein the second data is associated with the second portion of the first communication service, and computing a first time gap for releasing at least one resource in a first network associated with the first network connection based on: the first value for the first inactivity timer, the second value for the second inactivity timer, the first time, and the second time. System 100 can facilitate in whole or in part identifying a first value corresponding to a completion of a transmission of first data to a communication device via a first network connection, identifying a second value corresponding to a completion of a transmission of second data to the communication device via a second network connection that is different from the first network connection, computing a first term as a summation of the first value and a first inactivity timer, computing a second term as a summation of the second value and a second inactivity timer, wherein the second inactivity timer is different from the first inactivity timer, computing a value for a time gap as a difference between the first term and the second term, and adjusting respective shares of third data that are to be transmitted to the communication device via the first network connection and the second network connection based on the value for the time gap. System 100 can facilitate in whole or in part computing a first time gap associated with a completion of a first transfer of first data via a first network connection and a completion of a second transfer of second data via a second network connection that is different from the first network connection, determining, based on the computing of the first time gap, that the first time gap exceeds a threshold, and adjusting, based on the determining, respective shares of third data that are to be transferred via the first network connection and the second network connection.

In particular, in FIG. 1 a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
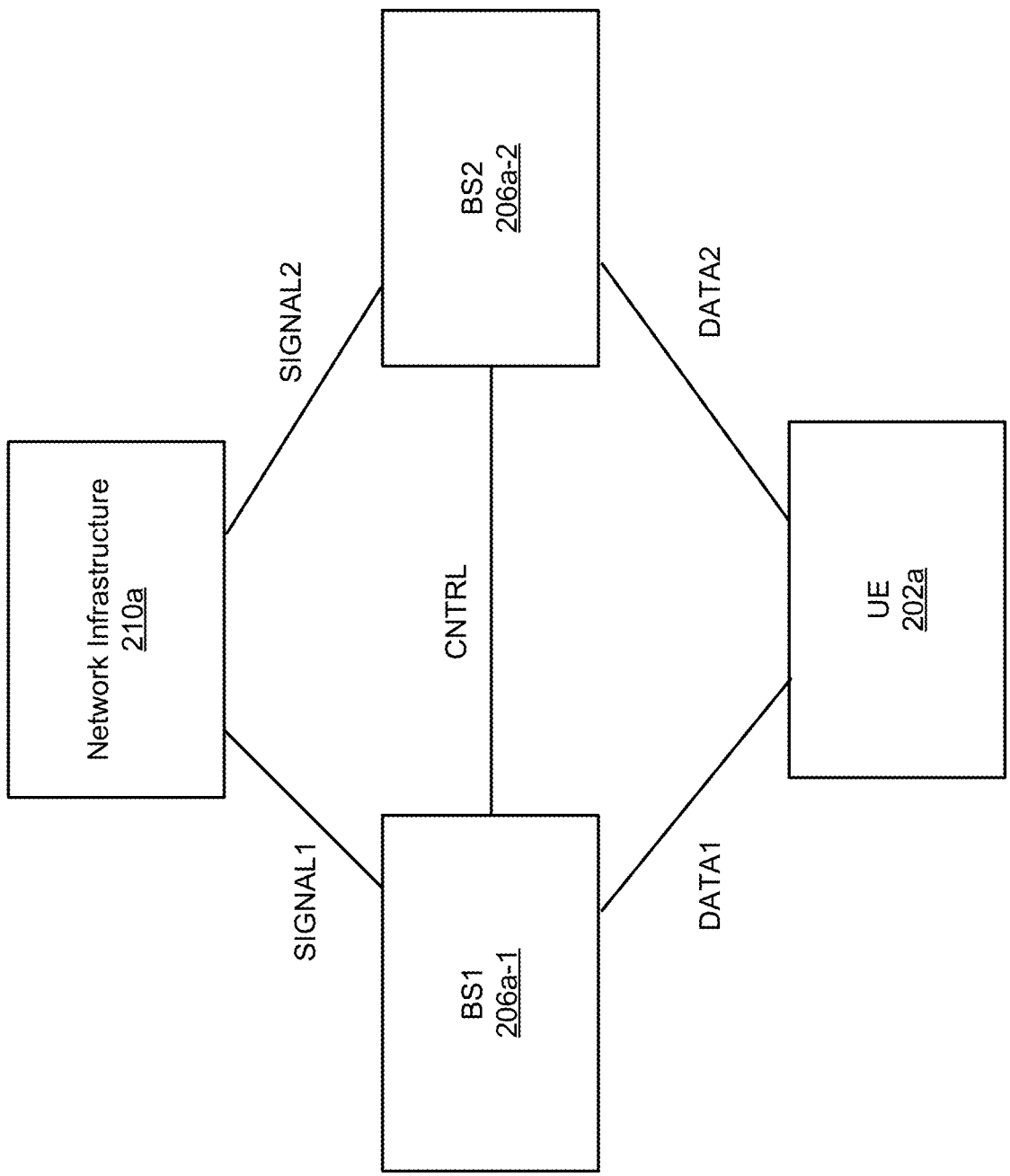
FIG. 2A is a block diagram illustrating an example, non-limiting embodiment of a system functioning within the communication network of FIG. 1 in accordance with various aspects described herein.

FIG. 2A is a block diagram illustrating an example, non-limiting embodiment of a system 200a in accordance with aspects of this disclosure. In some embodiments, the system 200a may function within, or may be operatively overlaid upon, the communication network 100 of FIG. 1.

The system 200a may support dual connectivity with respect to a communication device, such as a user equipment (UE) 202a. In particular, the UE 202a may be simultaneously connected to a first network and a second network. The first network may be operative in accordance with a first radio access technology (RAT) and the second network may be operative in accordance with a second RAT. The second RAT may be different from the first RAT. In an illustrative embodiment, the first RAT may correspond to an LTE or 4G network technology, and the second RAT may correspond to a 5G network technology.

Continuing the above example, the first network/RAT may be associated with, or include, a first base station (BS) 206a-1 and the second network/RAT may be associated with, or include, a second BS 206a-2. The use of the base stations BS1 206a-1 and BS2 206a-2 in FIG. 2A is illustrative. More generally, communication devices may be used in addition to the base stations and/or in place of the base stations.

In some embodiments, the base stations BS1 206a-1 and BS2 206a-2 may include, be associated with, or may be at least partially replaced by one or more radio intelligent controllers (RICs), mobile edge computing (MEC) devices, self-organized network (SON) elements, or the like. Stated slightly differently, functionality associated with the base stations may be distributed amongst other devices (not shown in FIG. 2A), potentially inclusive of other devices that may be located proximal to an edge or boundary of a given network. As one skilled in the art would appreciate, relocating such functionality proximal to the edge of a network may reduce the latency experienced by the UE 202a in terms of, e.g., a transfer of data involving the UE 202a, decision-making processes involving the UE 202a, etc., which may enhance the quality of service (QoS) and/or quality of experience (QoE) involving the UE 202a.

As set forth above, the use of dual connectivity may enhance the amount of data that may be transferred and/or the rate at which the data is transferred from/to the UE 202a relative to a state/condition where a single network connection is used. In this respect, the UE 202a is shown as potentially being connected to: the BS1 206a-1 via a first link (denoted as DATA1 in FIG. 2A) and the BS2 206a-2 via a second link (denoted as DATA2 in FIG. 2A). In some embodiments, the links DATA1 and DATA2 may effectively be an extension of user plane or signaling functionality between network infrastructure 210a and the base stations BS1 206a-1 and BS2 206a-2 (denoted as SIGNAL1 and SIGNAL2, respectively, in FIG.2A).

In some embodiments, the system 200a may support/enable a master-slave configuration, whereby the first BS1 206a-1 may serve as a master/primary and the second BS2 206a-2 may serve as a slave/secondary. Control of dual connectivity may be resident in the primary. For example, in operation the UE 202a may initially connect to network/communication services via the primary. If the UE 202a supports dual connectivity on a frequency band that a secondary supports, the primary may instruct the UE 202a to make measurements on one or more channels/links (e.g., DATA2 in FIG. 2A) associated with one or more secondaries. Assuming that the UE 202a finds/locates a candidate secondary based on such measurements, the primary may communicate to the (candidate) secondary (such as, for example, via the control [CNTRL] interface between the base stations BS1 206a-1 and BS2 206a-2 shown in FIG. 2A) any parameters that may be needed to establish a connection between the secondary and the UE 202a. Once the secondary confirms the establishment of the connection with the UE 202a, the primary may forward a part/portion of the data destined for the UE 202a to the secondary for transmission by the secondary to the UE 202a. Optionally, the primary can then request that the network infrastructure 210a (which may include one or more gateways, authentication servers, billing servers, and the like) to directly exchange user data with the secondary. More generally, in relation to a split of data across the two networks/RATs, the split may occur at the network infrastructure 210a, at the primary/BS1 206a-1, and/or at the secondary/BS2 206a-2. The split of data may occur in respect of a downlink direction, an uplink direction, or both downlink and uplink directions.

In many networks, power saving mechanisms may be used to reduce the amount of power consumed/dissipated by the UE 202a. For example, if a communication channel is not being used (or is being used infrequently—e.g., less than a threshold amount), power savings may be obtained/realized by causing a receiver of the UE 202a to be placed in a low or lower mode of operation. Management and regulation of the modes of operation of the UE 202a may be incorporated as part of a discontinuous reception (DRX) scheme or algorithm.

Initially, when the UE 202a is in a first mode/state of operation (referred to herein as an RRC-Connected Stage), the UE 202a may monitor a Physical Downlink Control Channel (PDCCH) every subframe to check if there is downlink data available. Upon successfully detecting a transmission (in either the uplink or downlink direction), a timer may be started, where the timer specifies the number of consecutive subframes that the UE 202a should be active. If the timer reaches a threshold amount/count, without detecting another transmission, the UE 202a may transition from the first mode/state (RRC-Connected Stage) to a second mode/state of operation described below.

In the second mode/state of operation (referred to herein as DRX-Mode), the UE 202a may monitor the PDCCH less frequently than in the first mode/state of operation. In the DRX-Mode, if no new transmission (in either the uplink or downlink direction) is detected for a threshold amount of time, the UE 202a may transition from the second mode/state (DRX-Mode) to a third mode/state of operation described below. Otherwise, if the UE 202a detects a new transmission (in either the uplink or downlink direction) prior to an expiration of the threshold amount of time, the UE 202a may transition from the second mode/state back to the first mode/state.

In the third mode/state of operation (referred to herein as RRC-Idle), the UE 202a may monitor the PDCCH less frequently than in the second mode/state of operation. In the RRC-Idle, if the UE 202a detects a new transmission (in either the uplink or downlink direction), the UE 202a may transition from the third mode/state back to the first mode/state; otherwise, the UE 202a may remain in the third mode/state.

The use of three mode/states in the foregoing example is illustrative. One skilled in the art will appreciate, based on a review of this disclosure, that more or fewer than three modes/states of operation may be utilized in a given embodiment. Furthermore, one skilled in the art will appreciate that a definition of values for one or more thresholds may be used to manage or regulate when the UE 202a transitions from a given state to another state. For example, if a network operator/engineer intends to reduce (e.g., minimize) power consumption at the UE 202a, then the thresholds may be selected to be small (in terms of a count of subframes, an amount of time, etc.) so that the UE 202a "quickly" transitions into a power-saving mode of operation (RRC-Idle in the foregoing example), thereby preserving power at the UE 202a and reducing (e.g., minimizing) network resource consumption (e.g., reducing a utilization of network connections/links). However, if a transmission does occur (in either the uplink or downlink direction) when the UE 202a is in the power-saving mode, there is a transition delay for the UE 202a to "wake up" and process (data associated with) the transmission. Conversely, if the thresholds are selected to be large, the UE 202a may be more likely to be awake to process transmissions, at the expense of increased power consumption by the UE 202a and increased utilization of network resources. Accordingly, one skilled in the art will appreciate that trade-offs may be made between an availability of the UE 202a to quickly process transmissions on the one hand, versus preserving power and network resources on the other hand, based on the values of the thresholds that are selected.

In general, and in the context of dual connectivity, the use of the thresholds described above may be independent between networks/network connections/links. For example, and referring to FIG. 2A, a first threshold associated with the first BS1 206a-1/first link DATA1 may be different from a second threshold associated with the second BS1 206a-2/second link DATA2. Still further, a first amount of data that is transferred via the first network/first link DATA1 may be different from a second amount of data that is transferred via the second network/second link DATA2. However, and in the context of the above description regarding the use of a primary and one or more secondaries, at least some protocols, standards, or specifications, such as those promulgated by the Third Generation Partnership Project (3GPP), specify that if: (1) dual connectivity is being utilized, and (2) a primary connection/link has reached a state/mode of inactivity (as represented by an expiration of a primary threshold timer) prior to a secondary connection/link reaching a state/mode of inactivity, the primary must wait for the secondary connection/link to reach a state/mode of inactivity (as represented by an expiration of a secondary threshold timer) before the primary can release resources associated with the primary connection/link. Thus, there may be a time delay or time gap (denoted herein as delta ($\Delta$)) between when the primary connection/link reaches a state/mode of inactivity and when the secondary connection/link reaches a state/mode of inactivity. This time delay/time gap may be expressed as:

$$\Delta = (t.2 + secondary\_inactivity\_timer) - (t.1 + primary\_inactivity\_timer),$$

where t.1 represents when the primary connection/link conveys a first final transmission (e.g., a first final packet) as part of a primary transaction/transfer, primary_inactivity_timer represents a first threshold amount of time that is used on the primary connection/link to declare that the primary connection/link is inactive following the first final transmission, t.2 represents when the secondary connection/link conveys a second final transmission (e.g., a second final packet) as part of a secondary transaction/transfer, and secondary_inactivity_timer represents a second threshold amount of time that is used on the secondary connection/link to declare that the secondary connection/link is inactive following the second final transmission.

If the value of delta ($\Delta$) is large, that implies the primary is waiting on the secondary "for a long time" to complete the secondary transaction/transfer. A large value of delta ($\Delta$) may be representative of inefficiencies in terms of UE 202a power consumption and retention of network resources on the primary that are not being actively utilized. Thus, aspects of this disclosure may seek to reduce (e.g., minimize) the value of delta ($\Delta$) to enhance efficiencies in terms of power savings and a release of network resources.

Figure 2B:
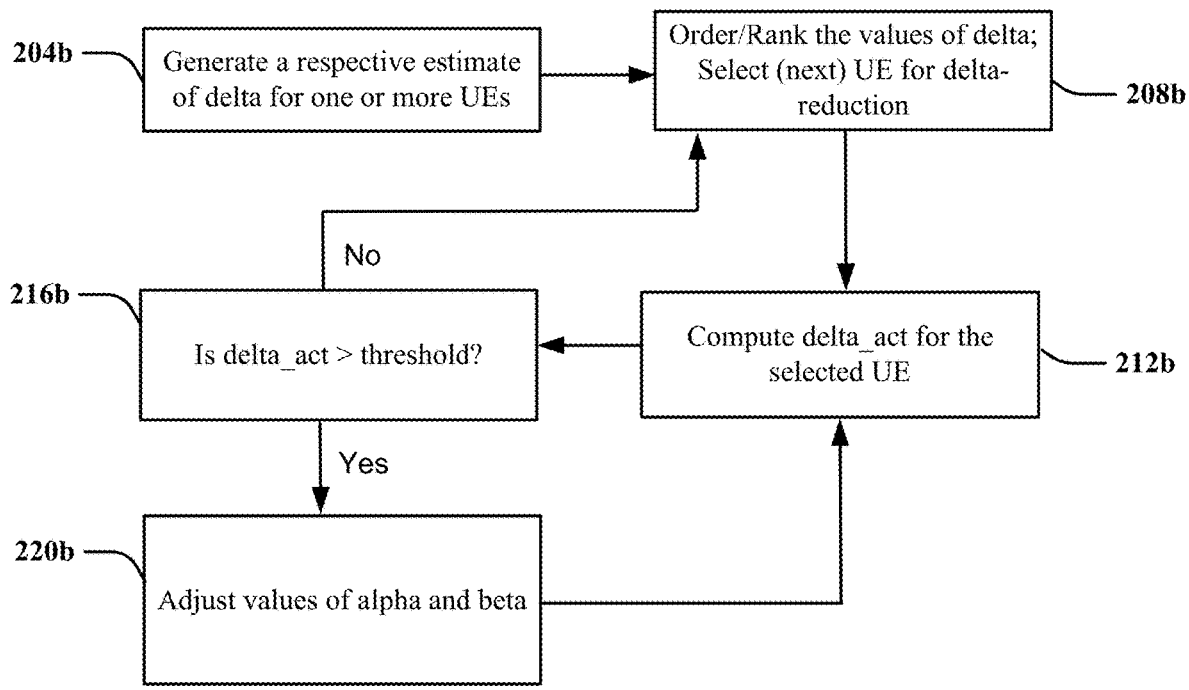
FIG. 2B depicts an illustrative embodiment of a method in accordance with various aspects described herein.

Referring now to FIG. 2B, an illustrative embodiment of a method 200b in accordance with various aspects described herein is shown. The method 200b may be facilitated, in whole or in part, by one or more systems, devices, and/or components, such as for example the systems, devices, and components set forth herein. The method 200b may be executed to manage/regulate resources and power consumption in one or more communication devices, systems, or networks, as set forth in further detail below in relation to the blocks/operations of the method 200b. In some embodiments, the method 200b may be executed to reduce the value of delta ($\Delta$), described above, for a UE.

In block 204b, an estimate/prediction may be generated for likely values of delta ($\Delta$) for each of one or more UEs included in a plurality of identified UEs. Assuming that block 204b is executed once for each $UE_i$ of a count of 'I' UEs (e.g., where i=1, i=2, ... i=I), a plurality of delta values ($\Delta_i$) may be generated/computed, where the $i^{th}$ value of $\Delta$ corresponds to the $i^{th}$ UE (e.g., $UE_i$).

The estimate of block 204b may be facilitated via an execution of one or more algorithms, such as for example a machine learning (ML) based algorithm and/or artificial intelligence (AI) based algorithm. The estimate of block 204b may be based on obtained information regarding: a power level of a UE, an application executed by the UE, a type or class of traffic conveyed by the UE, a first amount/degree of coverage of a first/primary network, a second amount/degree of coverage of a second/secondary network, first bandwidth available from/in the first/primary network, second bandwidth available from/in the second/secondary network, a split in traffic/data between the first/primary network and the second/secondary network, values of inactivity timers (e.g., values for the parameters primary_inactivity_timer and secondary_inactivity_timer set forth above), or any combination thereof.

In block 208b, assuming that more than one value of delta is computed in conjunction with block 204b (e.g., assuming that I>1), the values of delta ($\Delta_i$) may be ordered/ranked. For example, block 208b may include generating a list of the values of delta ($\Delta_i$) ordered from the lowest value of $\Delta_i$ to the highest value of $\Delta_i$ (or vice versa). All other conditions being assumed to be equal, the method 200b may prioritize the UE with the highest value of $\Delta_i$ for reduction; in subsequent iterations of the method 200b, the method 200b may next prioritize the UE with the next highest value of $\Delta_i$. Of course, the foregoing assumption may be relaxed to allow for a more nuanced, factor-based approach. For example, a first UE ($UE_1$) with a first value $\Delta_1$ may be taken up for delta-reduction ($\Delta$-reduction) first even though the value $\Delta_1$ is less than a second value $\Delta_2$ associated with a second UE ($UE_2$). Perhaps, in this particular example, the first $UE_1$ obtains priority relative to the second $UE_2$.

In block 212b, an actual value of delta ($\Delta_{act}$) for the UE of block 208b may be determined/computed. For example, and assuming that the operations of block 212b are being performed in respect of the system 200a (e.g., the UE 202a) of FIG. 2A, block 212b may include the following sub-operations:

(1) identifying a total number of data bits, DB (or, analogously, a remaining number of bytes, packets, etc.) remaining to be transferred to/from the UE 202a as part of a communication service provided to the UE 202a, (2) determining/identifying a rate at which data is conveyed via the first network connection/link (DATA1) as primary.data.rate, (3) determining/identifying a rate at which data is conveyed via the second network connection/link (DATA2) as secondary.data.rate, (4) computing actual values of t.2 and t.1 for the UE in question (UE 202a in this example), where t.2 and t.1 are the time that the last packet is conveyed via the links DATA2 and DATA1, respectively. In particular, as part of this sub-operation (4) of block 212b, the actual value of t.2 (denoted as $t.2_{act}$) may be computed as:

$$t.2_{act}=(DB*beta)/secondary.data.rate,$$

and the actual value of t.1 (denoted as $t.1_{act}$) may be computed as:

$$t.1_{act}=(DB*alpha)/primary.data.rate,$$

where the values of alpha and beta may correspond to the respective share/split/percentage of the total traffic/DB between the first network connection/link (DATA1) and the second network connection/link (DATA2), subject to the condition that alpha+beta=100%.

Assuming that respective values of the inactivity timers (e.g., primary_inactivity_timer and secondary_inactivity_timer) associated with the first network connection/link (DATA1) and the second network connection/link (DATA2) are fixed or known (such as for example in relation to an execution of block 204b), then $\Delta_{act}$ may be computed as part of a fifth (5) sub-operation of block 212b as:

$$\Delta_{act}=(t.2_{act}+\text{secondary\_inactivity\_timer})-(t.1_{act}+\text{primary\_inactivity\_timer}).$$

In block 216b, a determination may be made whether the value of $\Delta_{act}$ computed as part of block 212b (sub-operation (5)) is greater than a threshold (where the threshold may be equal to zero, or some other value). If so, flow may proceed from block 216b to block 220b; otherwise, the flow of the method 200b may proceed to the next delta-reduction (Δ-reduction) operation for the next UE, as described above as part of block 208b.

In block 220b, values of alpha and beta may be adjusted (potentially in real-time, or substantially in real-time) in an effort to reduce the value of $\Delta_{act}$ for the UE in question. From block 220b, flow may proceed to block 212b to recompute the value of $\Delta_{act}$ in accordance with the values of alpha and beta as determined/adjusted as part of block 220b.

While for purposes of simplicity of explanation, the respective processes are shown and described as a series of blocks in FIG. 2B, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

While aspects of the method 200b (e.g., the selection of block 208b) were described above as being applied to each UE of a plurality of (identified) UEs sequentially/serially, in some embodiments aspects of the method 200b may be applied/executed in parallel with respect to one another. For example, Δ-reduction may be applied simultaneously to more than one UE in some embodiments, such as for example in relation to a distributed processing system/architecture, via an instantiation of multiple instances of a processing thread, etc.

Assuming that the first network connection/link (DATA1) of FIG. 2A is capable of a higher data transfer rate than the second network connection/link (DATA2) of FIG. 2A, an execution of the method 200b (e.g., an execution of the block 220b) in conjunction with the system 200a may tend to increase the value of alpha and decrease the value of beta. The increase in the value of alpha and the decrease in the value of beta would yield an increase in the value of $t.1_{act}$ and a decrease in the value of $t.2_{act}$, which would tend to decrease $\Delta_{act}$. As set forth above, the decrease in $\Delta_{act}$ may result in power savings (e.g., a reduction in power consumption) at/by the UE 202a and may tend to preserve network resources by allowing the network resources to be released and/or allocated to other uses.

Values associated with one or more parameters or operations set forth herein may serve as a basis for taking/initiating/invoking one or more methodological actions. In this respect, values may be compared to one another, potentially as a function of one or more thresholds, to prioritize a first device relative to other devices in respect of such actions. Priority may be used in conjunction with a recognition that resources are finite, and accordingly, decisions may need to be made how to allocate resources to their best or most efficient use.

In some embodiments, (values of/for) one or more thresholds may be determined in accordance with, or based on, an occurrence of one or more events or conditions. For example, the threshold(s) may be based on one or more of: actual network conditions, predicted network conditions, service type, etc. In some embodiments, the thresholds may be (dynamically) selected, determined, identified, and/or updated/modified by one or more communications devices, such as for example a user equipment, a network server, a switch, a router, a gateway, a modem, a base station, etc.

Aspects of this disclosure may bridge a gap that may be present between two or more networks. For example, aspects of this disclosure may be used to relate a first time that a first network/first network connection completes a first transfer of first data to a second time that a second network/second network connection completes a second transfer of second data. Based on that relation, respective shares of data that are allocated to the first network/first network connection and the second network/second network connection may be adjusted/modified/adapted to enhance the efficiency of (overall/total) network resource utilization. As described herein, aspects of this disclosure may attempt to reduce the time gap/difference between the first time and the second time set forth above (when taking into consideration any associated inactivity timers), so that, ideally, the time gap is as small as possible (all other conditions being assumed equal).

Figure 3:
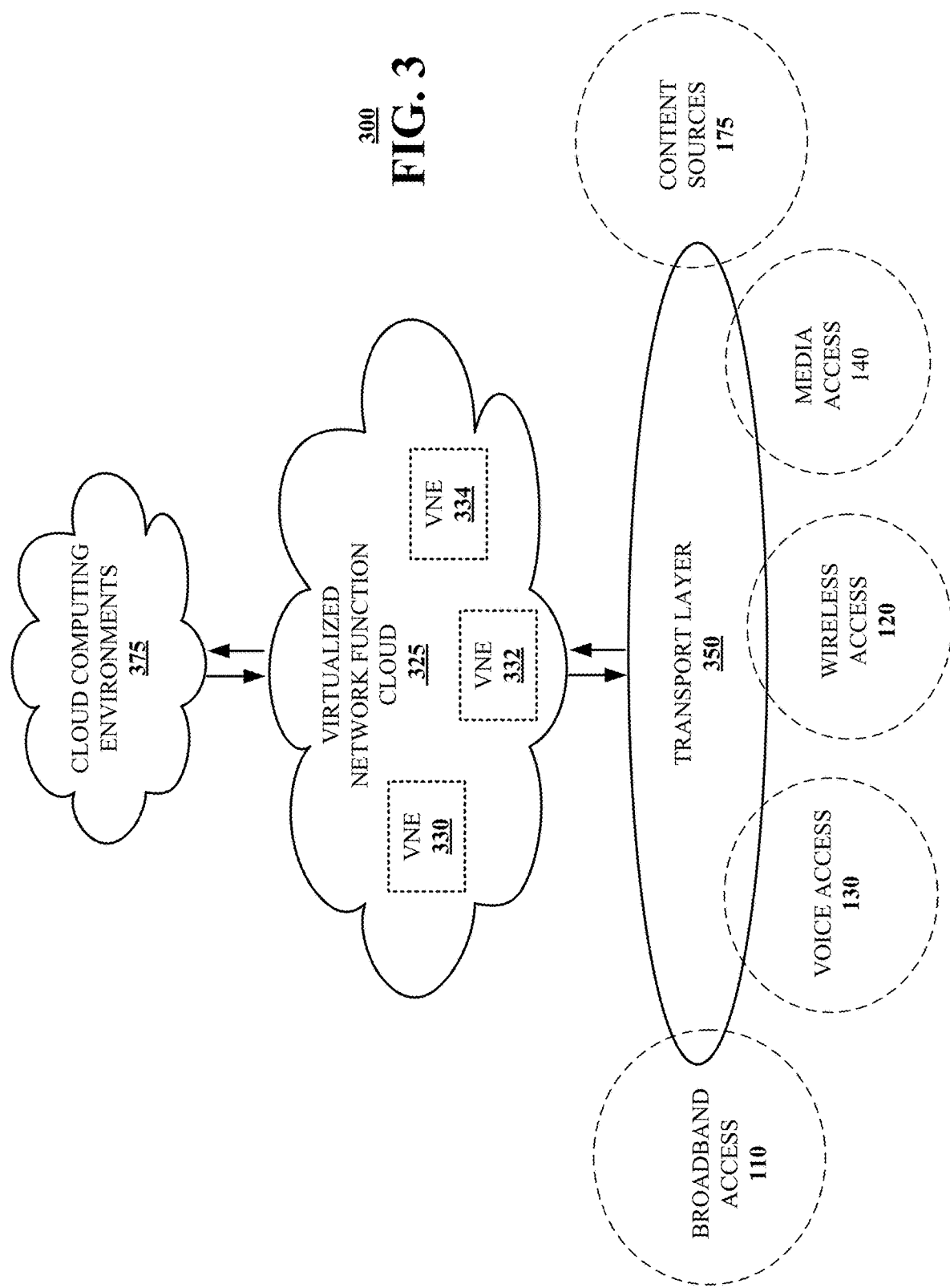
FIG. 3 is a block diagram illustrating an example, non-limiting embodiment of a virtualized communication network in accordance with various aspects described herein.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of system 100, the subsystems and functions of system 200a, and method 200b presented in FIGS. 1, 2A, and 2B. For example, virtualized communication network 300 can facilitate in whole or in part obtaining a first value for a first inactivity timer associated with a first network connection, wherein the first network connection is used to provision a first portion of a first communication service to a first user equipment, obtaining a second value for a second inactivity timer associated with a second network connection, wherein the second network connection is used to provision a second portion of the first communication service to the first user equipment, computing a first time associated with a completion of a transfer of first data via the first network connection, wherein the first data is associated with the first portion of the first communication service, computing a second time associated with a completion of a transfer of second data via the second network connection, wherein the second data is associated with the second portion of the first communication service, and computing a first time gap for releasing at least one resource in a first network associated with the first network connection based on: the first value for the first inactivity timer, the second value for the second inactivity timer, the first time, and the second time. Virtualized communication network 300 can facilitate in whole or in part identifying a first value corresponding to a completion of a transmission of first data to a communication device via a first network connection, identifying a second value corresponding to a completion of a transmission of second data to the communication device via a second network connection that is different from the first network connection, computing a first term as a summation of the first value and a first inactivity timer, computing a second term as a summation of the second value and a second inactivity timer, wherein the second inactivity timer is different from the first inactivity timer, computing a value for a time gap as a difference between the first term and the second term, and adjusting respective shares of third data that are to be transmitted to the communication device via the first network connection and the second network connection based on the value for the time gap. Virtualized communication network 300 can facilitate in whole or in part computing a first time gap associated with a completion of a first transfer of first data via a first network connection and a completion of a second transfer of second data via a second network connection that is different from the first network connection, determining, based on the computing of the first time gap, that the first time gap exceeds a threshold, and adjusting, based on the determining, respective shares of third data that are to be transferred via the first network connection and the second network connection.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
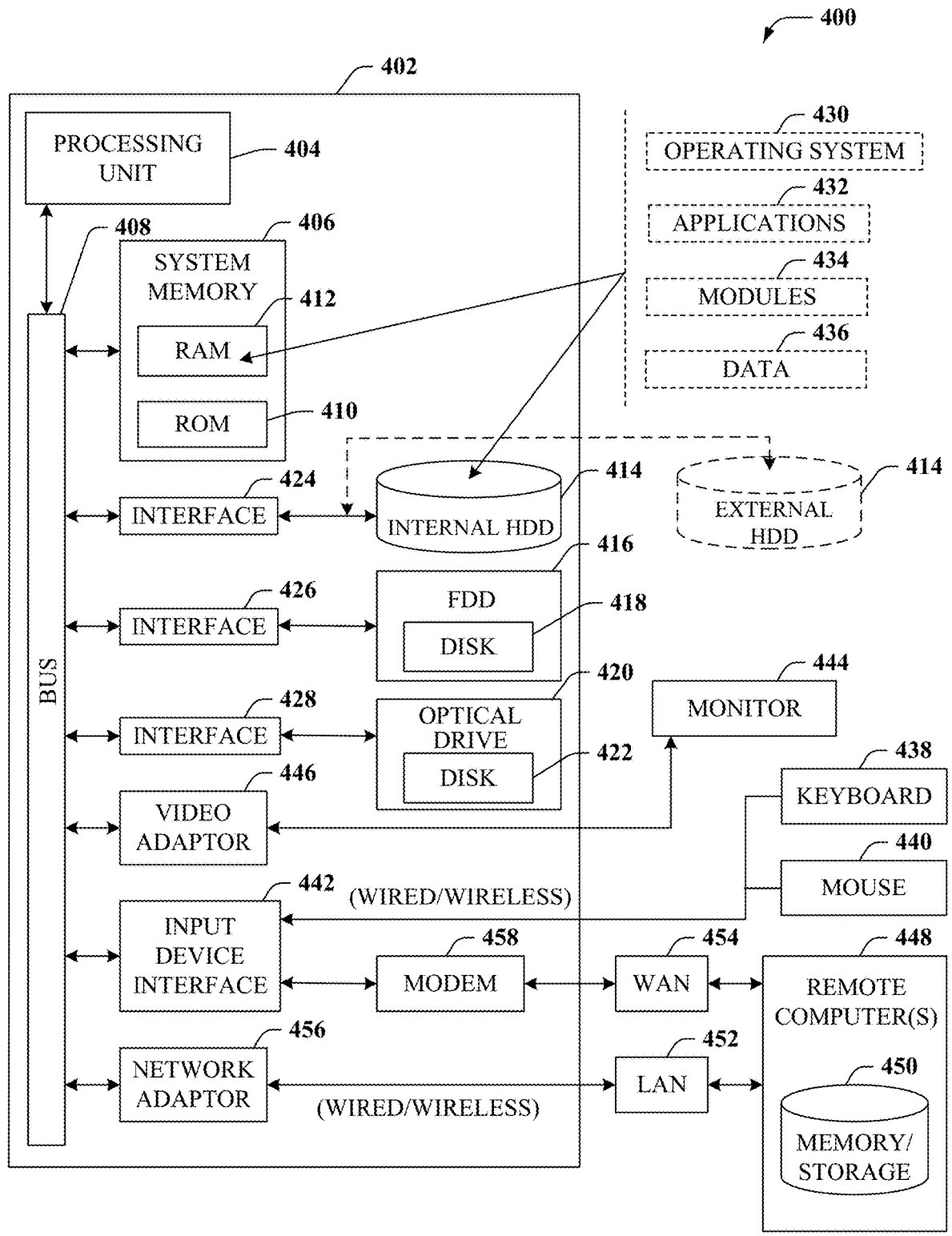
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part obtaining a first value for a first inactivity timer associated with a first network connection, wherein the first network connection is used to provision a first portion of a first communication service to a first user equipment, obtaining a second value for a second inactivity timer associated with a second network connection, wherein the second network connection is used to provision a second portion of the first communication service to the first user equipment, computing a first time associated with a completion of a transfer of first data via the first network connection, wherein the first data is associated with the first portion of the first communication service, computing a second time associated with a completion of a transfer of second data via the second network connection, wherein the second data is associated with the second portion of the first communication service, and computing a first time gap for releasing at least one resource in a first network associated with the first network connection based on: the first value for the first inactivity timer, the second value for the second inactivity timer, the first time, and the second time. Computing environment 400 can facilitate in whole or in part identifying a first value corresponding to a completion of a transmission of first data to a communication device via a first network connection, identifying a second value corresponding to a completion of a transmission of second data to the communication device via a second network connection that is different from the first network connection, computing a first term as a summation of the first value and a first inactivity timer, computing a second term as a summation of the second value and a second inactivity timer, wherein the second inactivity timer is different from the first inactivity timer, computing a value for a time gap as a difference between the first term and the second term, and adjusting respective shares of third data that are to be transmitted to the communication device via the first network connection and the second network connection based on the value for the time gap. Computing environment 400 can facilitate in whole or in part computing a first time gap associated with a completion of a first transfer of first data via a first network connection and a completion of a second transfer of second data via a second network connection that is different from the first network connection, determining, based on the computing of the first time gap, that the first time gap exceeds a threshold, and adjusting, based on the determining, respective shares of third data that are to be transferred via the first network connection and the second network connection.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM),flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10 BaseT wired Ethernet networks used in many offices.

Figure 5:
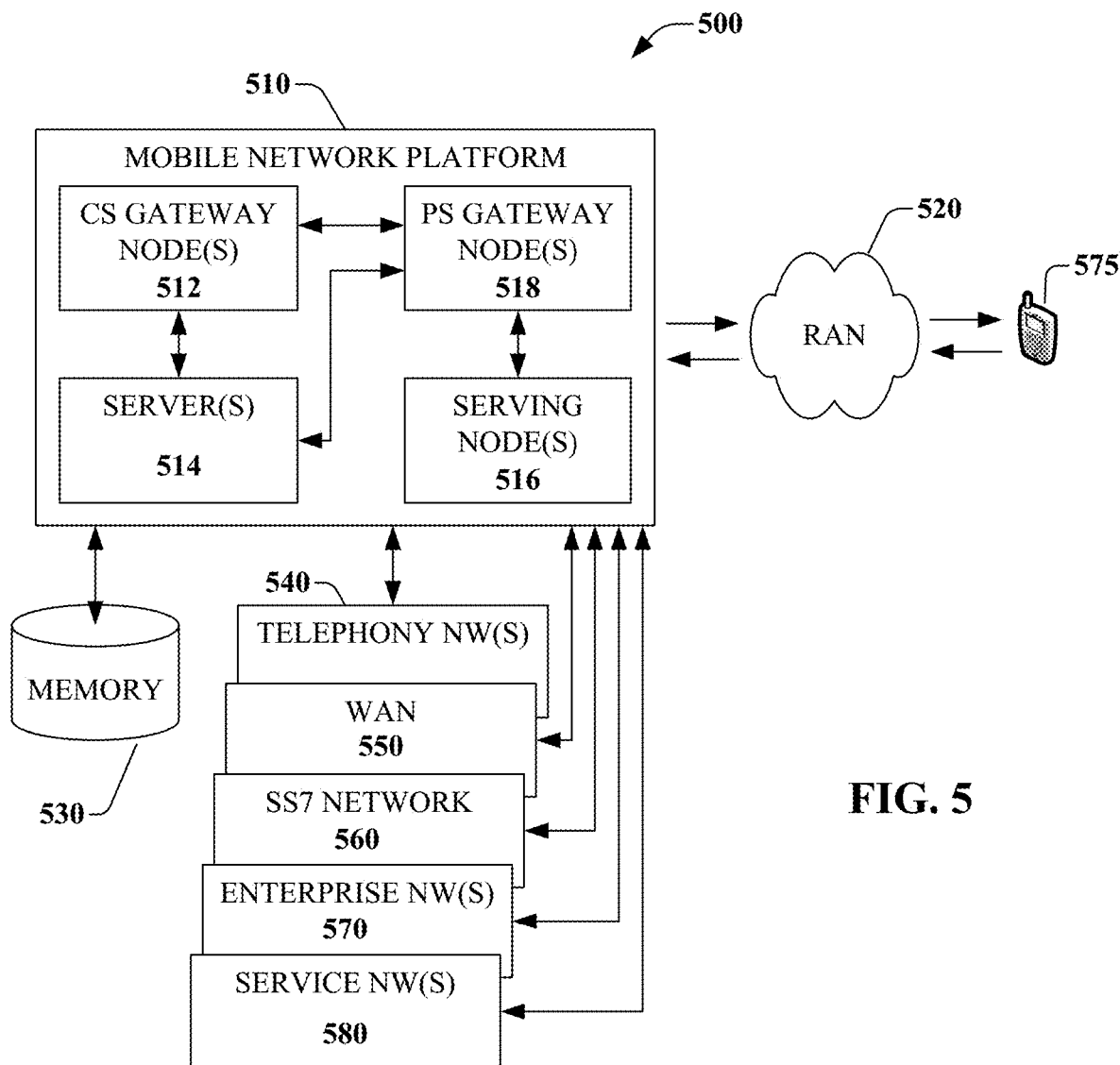
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part obtaining a first value for a first inactivity timer associated with a first network connection, wherein the first network connection is used to provision a first portion of a first communication service to a first user equipment, obtaining a second value for a second inactivity timer associated with a second network connection, wherein the second network connection is used to provision a second portion of the first communication service to the first user equipment, computing a first time associated with a completion of a transfer of first data via the first network connection, wherein the first data is associated with the first portion of the first communication service, computing a second time associated with a completion of a transfer of second data via the second network connection, wherein the second data is associated with the second portion of the first communication service, and computing a first time gap for releasing at least one resource in a first network associated with the first network connection based on: the first value for the first inactivity timer, the second value for the second inactivity timer, the first time, and the second time. Platform 510 can facilitate in whole or in part identifying a first value corresponding to a completion of a transmission of first data to a communication device via a first network connection, identifying a second value corresponding to a completion of a transmission of second data to the communication device via a second network connection that is different from the first network connection, computing a first term as a summation of the first value and a first inactivity timer, computing a second term as a summation of the second value and a second inactivity timer, wherein the second inactivity timer is different from the first inactivity timer, computing a value for a time gap as a difference between the first term and the second term, and adjusting respective shares of third data that are to be transmitted to the communication device via the first network connection and the second network connection based on the value for the time gap. Platform 510 can facilitate in whole or in part computing a first time gap associated with a completion of a first transfer of first data via a first network connection and a completion of a second transfer of second data via a second network connection that is different from the first network connection, determining, based on the computing of the first time gap, that the first time gap exceeds a threshold, and adjusting, based on the determining, respective shares of third data that are to be transferred via the first network connection and the second network connection.

In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
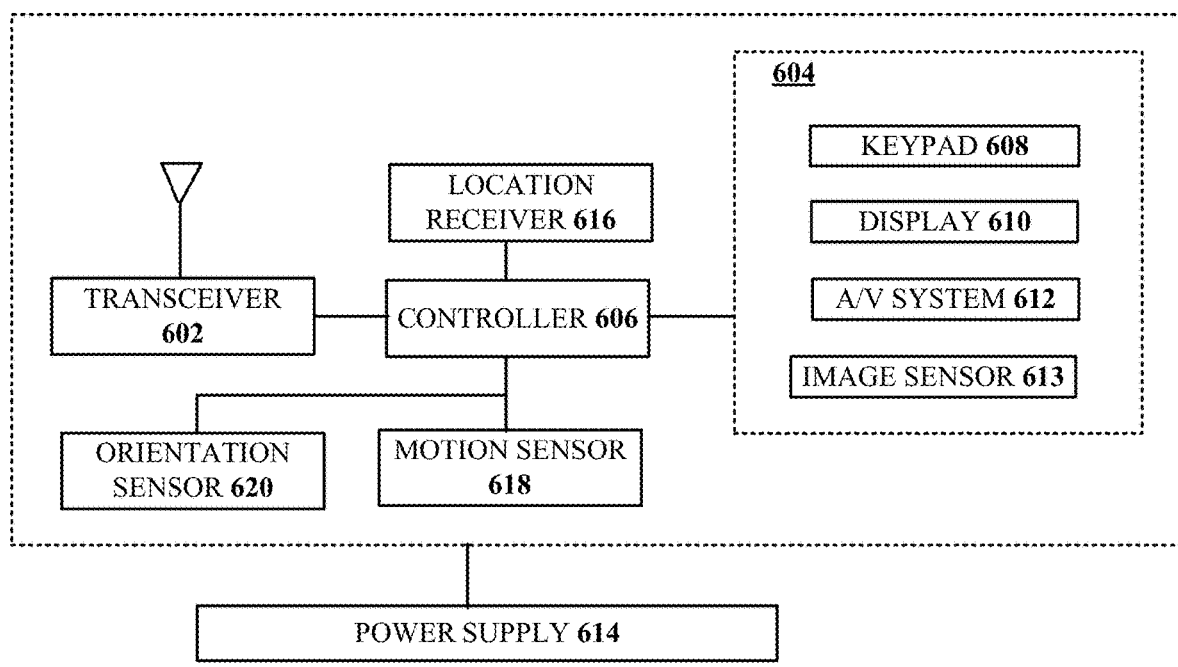
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part obtaining a first value for a first inactivity timer associated with a first network connection, wherein the first network connection is used to provision a first portion of a first communication service to a first user equipment, obtaining a second value for a second inactivity timer associated with a second network connection, wherein the second network connection is used to provision a second portion of the first communication service to the first user equipment, computing a first time associated with a completion of a transfer of first data via the first network connection, wherein the first data is associated with the first portion of the first communication service, computing a second time associated with a completion of a transfer of second data via the second network connection, wherein the second data is associated with the second portion of the first communication service, and computing a first time gap for releasing at least one resource in a first network associated with the first network connection based on: the first value for the first inactivity timer, the second value for the second inactivity timer, the first time, and the second time. Computing device 600 can facilitate in whole or in part identifying a first value corresponding to a completion of a transmission of first data to a communication device via a first network connection, identifying a second value corresponding to a completion of a transmission of second data to the communication device via a second network connection that is different from the first network connection, computing a first term as a summation of the first value and a first inactivity timer, computing a second term as a summation of the second value and a second inactivity timer, wherein the second inactivity timer is different from the first inactivity timer, computing a value for a time gap as a difference between the first term and the second term, and adjusting respective shares of third data that are to be transmitted to the communication device via the first network connection and the second network connection based on the value for the time gap. Computing device 600 can facilitate in whole or in part computing a first time gap associated with a completion of a first transfer of first data via a first network connection and a completion of a second transfer of second data via a second network connection that is different from the first network connection, determining, based on the computing of the first time gap, that the first time gap exceeds a threshold, and adjusting, based on the determining, respective shares of third data that are to be transferred via the first network connection and the second network connection.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)=$ confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:
1. A device, comprising:
a processing system including a processor; and
a memory that stores executable instructions that, when executed by the processing system, facilitate performance of operations, the operations comprising:

computing a first time associated with a completion of a transfer of first data via a first network connection;

computing a second time associated with a completion of a transfer of second data via a second network connection;

computing a first time gap for releasing at least one resource in a first network associated with the first network connection based on: a first value for a first inactivity timer, a second value for a second inactivity timer, the first time, and the second time; and reducing the first time gap when the first time gap is greater than a threshold.

2. The device of claim 1, wherein the first data is associated with a first portion of a first communication service and the second data is associated with a second portion of the first communication service.

3. The device of claim 1, wherein the first value for the first inactivity timer is associated with the first network connection and the second value for the second inactivity timer is associated with the second network connection.

4. The device of claim 1, wherein the operations further comprise:
determining that the first time gap is greater than the threshold; and
responsive to the determining that the first time gap is greater than the threshold, increasing a first share of third data associated with a first communication service, wherein the first share is allocated to the first network connection.

5. The device of claim 4, wherein the operations further comprise:
responsive to the determining that the first time gap is greater than the threshold, decreasing a second share of the third data, wherein the second share is allocated to the second network connection.

6. The device of claim 5, wherein the operations further comprise:
computing a third time associated with a completion of a transfer of the first share of the third data via the first network connection; and
computing a fourth time associated with a completion of a transfer of the second share of the third data via the second network connection.

7. The device of claim 6, wherein the operations further comprise:
computing a second time gap for releasing the at least one resource in the first network based on: the first value for the first inactivity timer, the second value for the second inactivity timer, the third time, and the fourth time.

8. The device of claim 7, wherein the second time gap is less than the first time gap.

9. The device of claim 1, wherein the threshold is different from zero.

10. The device of claim 1, wherein the computing of the first time is based on a first data rate associated with a transfer of data via the first network connection.

11. The device of claim 10, wherein the computing of the second time is based on a second data rate associated with a transfer of data via the second network connection.

12. The device of claim 11, wherein the second data rate is different from the first data rate.

13. The device of claim 1, wherein the second value for the second inactivity timer is different from the first value for the first inactivity timer.

14. The device of claim 1, wherein the computing of the first time gap comprises:
computing a first term as a summation of the second time and the second value for the second inactivity timer;
computing a second term as a summation of the first time and the first value for the first inactivity timer; and
subtracting the second term from the first term to generate the first time gap.

15. The device of claim 1, wherein at least a portion of the transfer of the first data and at least a portion of the transfer of the second data occur concurrently.

16. The device of claim 1, wherein the operations further comprise:
releasing the at least one resource based on the computing of the first time gap.

17. The device of claim 1, wherein the second network connection is associated with a second network, wherein the first network is operative in accordance with a first radio access technology (RAT), wherein the second network is operative in accordance with a second RAT, and wherein the second RAT is different from the first RAT.

18. The device of claim 1, wherein the first network connection is used to provision a first portion of a first communication service to a first user equipment, and wherein the operations further comprise:
predicting a value for the first time gap in advance of the computing of the first time gap, resulting in a predicted first value;
predicting a value for a second time gap associated with a second user equipment in advance of the computing of the first time gap, resulting in a second predicted value;
comparing the first predicted value and the second predicted value to one another; and
selecting the first user equipment based on the comparing, wherein the computing of the first time gap is further based on the selecting of the first user equipment.

19. A non-transitory machine-readable medium, comprising executable instructions that, when executed by a processing system including a processor, facilitate performance of operations, the operations comprising:
identifying a first value corresponding to a completion of a transmission of first data via a first network connection;
identifying a second value corresponding to a completion of a transmission of second data via a second network connection that is different from the first network connection;
computing a first term based on the first value and a first inactivity timer;
computing a second term based on the second value and a second inactivity timer, wherein the second inactivity timer is different from the first inactivity timer;
computing a value for a time gap as a difference between the first term and the second term; and
adjusting respective shares of third data that are to be transmitted via the first network connection and the second network connection based on the value for the time gap in order to reduce the time gap.

20. A method, comprising:
computing, by a processing system including a processor, a first time gap for releasing at least one resource associated with a first network connection, the first time gap corresponding to a time between a time of completion of a first transfer of first data via the first network connection and a time of completion of a second transfer of second data via a second network connection that is different from the first network connection; and adjusting, by the processing system and based on the computing, respective shares of third data that are to be transferred via the first network connection and the second network connection in order to reduce the first time gap.

* * * * *